V. T. GRABS.
HILLSIDE AND ROADSIDE DITCHER.
APPLICATION FILED NOV. 28, 1917.
1,299,932.
Patented Apr. 8, 1919.
4 SHEETS—SHEET 1.
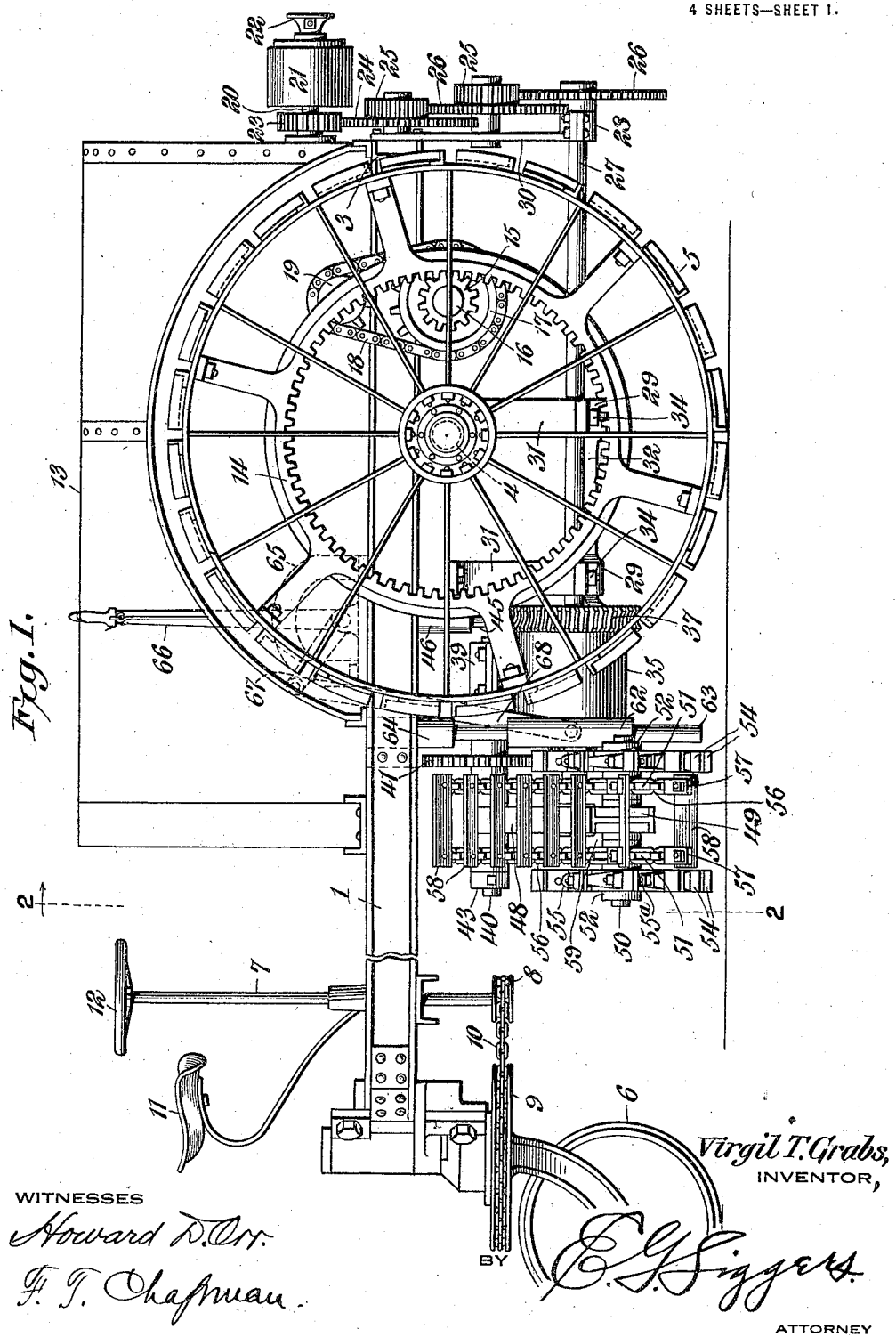
WITNESSES
Howard D. Orr.
F. T. Chapman.
Virgil T. Grabs,
INVENTOR,
BY
ATTORNEY

V. T. GRABS.
HILLSIDE AND ROADSIDE DITCHER.
APPLICATION FILED NOV. 28, 1917.

1,299,932.

Patented Apr. 8, 1919.
4 SHEETS—SHEET 2.

Virgil T. Grabs,
INVENTOR,

WITNESSES
Howard D. Orr.
F. T. Chapman.

BY E. G. Siggers
ATTORNEY

V. T. GRABS.
HILLSIDE AND ROADSIDE DITCHER.
APPLICATION FILED NOV. 28, 1917.

1,299,932.

Patented Apr. 8, 1919.
4 SHEETS—SHEET 3.

Virgil T. Grabs, INVENTOR,

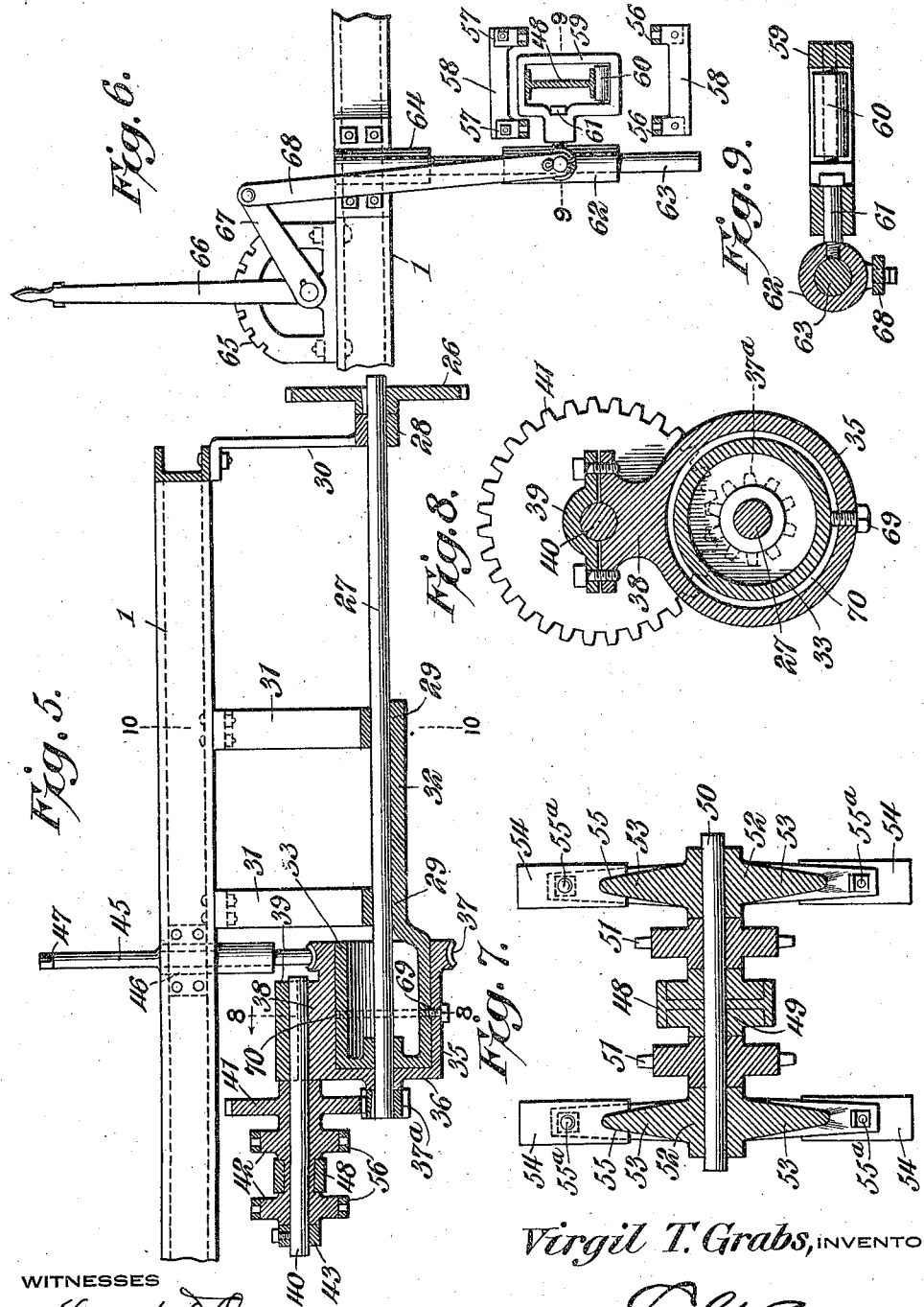

UNITED STATES PATENT OFFICE.

VIRGIL T. GRABS, OF KING, NORTH CAROLINA.

HILLSIDE AND ROADSIDE DITCHER.

1,299,932.

Specification of Letters Patent.

Patented Apr. 8, 1919.

Application filed November 28, 1917. Serial No. 204,433.

*To all whom it may concern:*

Be it known that I, VIRGIL T. GRABS, a citizen of the United States, residing at King, in the county of Stokes and State of North Carolina, have invented a new and useful Hillside and Roadside Ditcher, of which the following is a specification.

This invention has reference to ditching machines for hillsides and roadsides, and its object is to provide means for attachment to different types of tractor vehicles whereby grading and ditching may be expeditiously performed.

In accordance with the invention, any suitable type of traction vehicle is utilized, especially a type where the traction wheels are at the front and steering is performed by a caster wheel or the like. The ditching or grading mechanism to which the invention is particularly directed comprises rotary and longitudinally movable digging means, the longitudinally movable parts serving as conveying means. The cutting or digging means are carried by an arm or support which in turn is mounted at one end upon a carrier capable of actuation about an axis lengthwise of the travel of the machine so that adjustments are made in a plane transverse of the machine. Provision is made for driving the cutting or digging elements from the power unit of the tractor vehicle without interference with the propulsion of the vehicle.

The invention will be best understood from a consideration of the following detailed description, taken in connection with the accompanying drawings forming part of this specification, with the further understanding that, while the drawings show a practical form of the invention, the latter is not confined to any strict conformity with the showing of the drawings but may be changed and modified so long as such changes and modifications come within the scope of the appended claims.

In the drawings:

Figure 1 is a side elevation of a tractor vehicle with the invention applied;

Fig. 2 is a section on the line 2—2 of Fig. 1;

Fig. 3 is a plan view with some parts in section and some parts broken away of the structures involved in the invention, the tractor vehicle being in most part omitted;

Fig. 4 is an elevation with some parts in section of transmission gearing and adjacent portions of the vehicle whereby power is transmitted from the power unit to the digging or excavating elements;

Fig. 5 is a section on the line 5—5 of Fig. 3;

Fig. 6 is a section on the line 6—6 of Fig. 2 with distant parts omitted;

Fig. 7 is a section on the line 7—7 of Fig. 3 but drawn on a larger scale;

Fig. 8 is a section on the line 8—8 of Fig. 5 but drawn on a larger scale and omitting distant parts;

Fig. 9 is a section on the line 9—9 of Fig. 6 but drawn on a larger scale and omitting certain parts;

Fig. 10 is a section on the line 10—10 of Fig. 5.

Referring to the drawings, there is shown a tractor vehicle provided with a main frame made up of longitudinal beams 1, 2 and end beams 3. The frame is carried near what constitutes its forward end upon an axle 4 having traction wheels 5 mounted thereon and near the rear end the frame is supported by a steering caster wheel 6 controlled by a steering post 7 connected to the caster wheel through the intermediary of drums 8 and 9 respectively, and a connecting chain 10. An operator's seat 11 is provided adjacent to the steering post, which latter is surmounted by an operating wheel 12 as is customary.

The main frame has a power unit 13 mounted thereon, such power unit being simply outlined in the drawings, and may be of any suitable type of which a multi-cylinder explosion engine may be taken as an example.

Either or both traction wheels 5 are arranged to be driven from the engine, and as an example of a suitable drive, there is shown in Fig. 1 an internal gear 14 fast to the traction wheel there illustrated, and this gear is engaged by a pinion 15 mounted on the shaft 16. Fast to the pinion 15 is a sprocket wheel 17 connected by a sprocket chain 18 to another sprocket wheel 19, receiving power from the engine, but the connections between the sprocket wheel 19 and the engine are not shown, since they form no part of the invention and may be of any suitable type. Ordinarily, in traction vehicles of the character shown in the drawings, transmission mechanism is arranged between the sprocket wheel 19 and the engine, but no attempt is made to show such transmission mechanism.

Projecting from the prime mover or engine 13 is a shaft 20 which may carry a pulley 21 for the delivery of power from the vehicle to any suitable mechanism to be driven, and this shaft may terminate in a coupling 22 for connecting it to other mechanism to be driven, but not forming any part of the invention.

On the shaft 20 there is mounted a pinion 23 in mesh with the gear wheel 24 and other pinions 25 and gear wheels 26 transmit motion to another shaft 27 which, in the particular arrangement shown, is supported in bearings 28, 29 at a low point on the traction vehicle, these bearings being carried by hangers 30 and 31 respectively of any suitable type and connected to appropriate parts of the main frame. The gearing transmitting power between the shafts 20 and 27 is located at the front of the traction vehicle, and the shaft 27 extends lengthwise of the traction vehicle at a suitable distance below the main frame toward the rear end of the traction vehicle. Mounted on the hangers 31, of which there are two spaced apart lengthwise of the vehicle, is an axial extension 32 of an enlarged spindle 33 held fixedly to the hangers 31 by bolts 34 or in any other appropriate manner.

Mounted on the spindle 33 is a sleeve 35 having one end 36 closed and at the other end provided with a peripheral series of worm teeth 37 constituting a worm wheel.

The shaft 27 extends axially through the spindle 33 and end 36 of the sleeve 35, and beyond said end where it has a pinion 37ª keyed or otherwise made fast to it. The sleeve 35 is formed on one side with a radial enlargement 38 provided with a cap plate 39 for binding thereto a spindle 40 projecting parallel with the shaft 27 eccentric thereto and toward the rear end of the vehicle.

Mounted on the spindle 40 is a gear wheel 41 and spaced sprocket wheels 42 all connected together at their hub portions and held on the spindle by a set collar 43 or in any other suitable manner. The gear wheel 41 is in mesh with the pinion 37ª so that when the shaft 27 is rotated, the gear wheel 41 and sprocket wheels 42 participate in such rotation.

In mesh with the worm teeth 37 is a worm 44 shown particularly in Figs. 2 and 3. This worm is on the lower end of an upright shaft 45 carried by a suitable bearing 46 on one of the beams 1, and having its upper extremity squared as shown at 47 or otherwise suitably shaped for the application of a turning tool whereby the sleeve or drum 35 may be rotated to definite extents about the spindle 33 and cause the gear wheel 41 and sprocket wheels 42 to participate in such orbital movement with respect to the shaft 27.

Mounted on the hub connecting the sprocket wheels 42 is one end of an arm 48 shown as an I-beam. At the other end the arm 48 is formed with a support 49 for an arbor 50 carrying sprocket wheels 51 corresponding to the sprocket wheels 42 and similarly spaced and fast to the arbor. Also fast to the arbor 50 outside of the sprocket wheels 51 are hub members 52 each formed with a series of arms 53 in approximately radial relation to the arbor, but all curving slightly in the same direction. The arms 53 constitute supports and seats for cutting blades 54 which, by being bifurcated at their inner ends as shown at 55, straddle the basic portions of the arms 53 and may therefore be held to the arms each by a single bolt 55ª without liability of twisting with relation to the part carrying them. Each hub 52 with its arms 53 and blades 54 constitutes a cutting wheel, there being two such wheels, one on each side of the arm 48.

Each sprocket wheel 42 alines with the corresponding sprocket wheel 51, and between each sprocket wheel 44 and its companion wheel 51, there extends a sprocket chain 56 having certain of its links formed with abutments 57, to each of which is made fast the corresponding end of a conveyer blade 58 which may also serve as a cutting blade.

The end of the arm 48 which is carried by the spindle 40 is supported thereby, and near the other end the arm 48 passes through a frame or yoke 59 being capable of movement therethrough in the direction of the length of the arm. To reduce friction, the yoke 59 is provided with a roller 60 on which the arm 48 may travel. The yoke 59 is carried by a stud 61 on which it may turn, and this stud is carried by a sleeve 62 movable lengthwise on a rod 63 depending from a support 64 of any suitable construction made fast to one of the side beams 1 of the main frame. The same side beam carries a rack segment 65 over which there is movable a hand lever 66 having fast to it an arm 67 connected to the sleeve 62 by a link 68, whereby the sleeve 62 may be adjusted in an up and down direction by a suitable manipulation of the lever 66.

The sleeve 35 is held onto the spindle 33 by a set screw 69 entering a circumferential groove 70 in the spindle. This is to be taken as indicative of any suitable means whereby the sleeve may be held on the spindle and yet be permitted to rotate thereon.

If it be assumed that a road is to be graded or more especially to be crowned, and before such operation is approximately flat from side to side, the traction machine is started and is caused to travel along the portion of the road to be treated. At the same time, power is transmitted to the digging wheels at the outer end of the arm 48, these wheels being driven by the conveyer chains 56. The operator lowers the yoke 59 which serves as a guide for the arm 48, thus causing the blades 54 to dig to the desired depth into the road bed and the blades 57 to also dig or cut into the road bed, but along a rising path carrying the excavated material toward the center of the roadway. The relation of the digging wheels to the traction wheels which is forward of the digging wheels is determined by the orbital position of the spindle 39. Such position is readily controlled by the operator through the worm gear connections with the sleeve 35 so that the cutting wheels are adjusted toward or from the side of the roadway. In this manner, a ditch or gutter is readily formed as the vehicle travels along the roadway, and while the traction wheels are on solid and relatively high ground. The caster wheel constituting the steering wheel also travels on solid ground, since the cutting of the roadway ceases before the line of travel of the caster wheel is reached.

The excavating is in a direction at substantially right angles to the line of travel of the vehicle, so that the excavating buckets or blades move crosswise of the roadway and may be adjusted to act on the roadway either directly behind or on either side of the traction wheel immediately in front of the excavating mechanism. Moreover, the angle and depth of cut with relation to the surface of the roadway may be readily regulated by raising and lowering the outer end of the arm 48 or raising and lowering the inner end of the arm 48 or both. The roadway may be graded on approximately a level, or may be crowned to a desired degree, or a ditch or gutter of considerable depth may be formed along the side of the roadway. These various operations are performed while the vehicle is traveling in a forward direction at approximately right angles to the direction of travel of the cutting implements with respect to their immediate supports.

What is claimed is:—

1. A machine for the purpose described, comprising a tractor vehicle having a main frame, traction wheels on opposite sides of the main frame at the forward end thereof, steering means at the rear end of the main frame, excavating devices beneath the main frame and located behind one of the traction wheels, a power shaft for driving the excavating devices extending lengthwise of the main frame on the side thereof remote from the excavating devices, an arm carrying the excavating devices at one end and at the other end provided with a mounting on the power shaft in eccentric relation thereto, means for rotating the mounting about the axis of the power shaft to move the arm lengthwise in transverse relation to the main frame, and driving connections between the power shaft and the excavating devices.

2. In a machine for the purpose described, a tractor vehicle provided with a main frame, a power unit mounted on the main frame, traction wheels carrying the main frame at the forward end and on opposite sides thereof, a supporting and steering caster wheel at the rear end of the main frame intermediate of the width thereof, a power shaft carried by the main frame on the underside thereof to one side of and in parallel relation to the longitudinal center line of the machine, an eccentric mounting on the power shaft, means for rotating the eccentric mounting, an arm carried by the mounting in eccentric relation to the power shaft and extending crosswise of and to the opposite side of the main frame beneath the latter to a point back of the traction wheel on the same side of the machine, excavating devices carried by the end of the arm back of the traction wheel, conveying means on the arm connected to the excavating devices for driving them, and gearing between the power shaft and the excavating devices for driving the latter.

3. A machine for the purpose described, comprising a tractor vehicle provided with a main frame, a power unit mounted on the main frame, traction wheels carrying the main frame at the forward end on opposite sides thereof, steering means at the rear end of the frame, a power shaft extending lengthwise of and mounted beneath the main frame on one side thereof, a rotatable member carried by the power shaft, means for rotatably adjusting the rotatable member at will, a stub shaft eccentrically carried by the rotatable member, sprocket gearing on the stub shaft, intermeshing gearing connections between the sprocket gearing and power shaft, an arm carried at one end by the stub shaft and extending crosswise of the main frame to a point behind the traction wheel on the opposite side of the frame, excavating means carried by the end of the arm remote from the stub shaft, and sprocket driving connections for the excavating means engaging the latter and the sprocket gearing on the stub shaft, said sprocket connections being provided with conveyer blades.

4. In a machine for the purpose described, a traction vehicle provided with a main frame, excavating devices mounted beneath the main frame and extended and having a line of travel individual to said devices transverse to the line of travel of the vehicle, guiding and supporting means for the excavating devices located at one side of the vehicle and extending above the main frame and constructed for the up and down adjustment of the excavating devices while the machine is moving, and independent means at the other side of the vehicle and extending above the main frame for the adjustment transversely of the vehicle through the supporting and guiding means of the excavating devices while the vehicle is moving.

5. In a machine for the purpose described, a traction vehicle, excavating devices mounted to travel therewith and having a line of travel individual to the excavating devices transverse to the line of travel of the vehicle, supporting and guiding means adjacent to one side of the vehicle for carrying and for the up and down adjustment of the excavating devices, and independent orbitally movable means located toward the other side of the vehicle for the adjustment of the excavating devices crosswise of said vehicle and provided with actuating means for effecting said adjustment at will and while the vehicle is in motion.

6. In a machine for the purpose described, a traction vehicle, excavating devices mounted to travel therewith and having an individual line of travel transverse to the line of travel of the vehicle, supporting and guiding means adjacent to one side of the vehicle for carrying and for the up and down adjustment of the excavating devices, means adjacent to the other side of the vehicle for adjusting the excavating devices crosswise of the vehicle and comprising a rotatable member and manipulating gearing for causing movement of the rotatable member through a complete rotation, and connections between the excavating devices and the rotatable member mounted thereon eccentric to the axis of rotation.

7. In a machine for the purpose described, a traction vehicle, excavating devices carried by the vehicle and having a line of travel independent of that of the vehicle transversely of the line of travel of the vehicle, and means for adjusting the excavating devices transversely of the line of travel of the vehicle, comprising a rotatable sleeve, a worm gear thereon, a worm engaging the worm gear and provided with means for manipulation of the worm, and a spindle constituting a support for the corresponding end of the excavating devices, said spindle being directly carried by the sleeve eccentrically to the axis of rotation thereof.

8. In a machine for the purpose described, a traction vehicle having a main frame, a power unit thereon, a power shaft carried by the main frame beneath the latter, a sleeve mounted on the power shaft for rotation thereon and traversed by the power shaft, a stub shaft on the sleeve in eccentric relation to the axis of rotation of the sleeve and projecting therefrom, a worm gear on the sleeve, a worm engaging the worm gear and provided with manipulating means extending into accessible position, an arm carried at one end by the stub shaft and extending across the main frame beneath the latter, excavating devices carried by the other end of the arm, sprocket pinions on the stub shaft and on the excavating devices, sprocket chains connecting the sprocket pinions and provided with conveyer blades, and gearing connections between the power shaft and the sprocket pinions on the stub shaft.

9. In a machine for the purpose described, a traction vehicle having a main frame, a power unit thereon, a power shaft carried by the main frame beneath the latter, a sleeve mounted on the power shaft for rotation thereon and traversed by the power shaft, a stub shaft on the sleeve in eccentric relation to the axis of rotation of the sleeve and projecting therefrom, a worm gear on the sleeve, a worm engaging the worm gear and provided with manipulating means extending into accessible position, an arm carried at one end by the stub shaft and extending across the main frame beneath the latter, excavating devices carried by the other end of the arm, sprocket pinions on the stub shaft and on the excavating devices, sprocket chains connecting the sprocket pinions and provided with conveyer blades, and gearing connections between the power shaft and the sprocket pinions on the stub shaft, the machine also being provided with supporting means for the arm on the side of the machine remote from the stub shaft and through which the arm is movable lengthwise, said supporting means having manipulating means for the raising and lowering of the supporting means and extending into accessible position.

10. In a machine for the purpose described, a traction vehicle provided with a main frame, excavating means carried by the frame beneath the latter and having a line of travel individual thereto transversely of the vehicle, means for raising and lowering the excavating means at one end, and means at the other end and independent of the first-named raising and lowering means for simultaneously moving the excavating means transversely of the vehicle and raising and lowering it, said last named means being provided with manipulating means for effecting the named movements and extending into accessible position.

11. In a machine for the purpose described, a traction vehicle, a power shaft near one side of the vehicle and extending lengthwise thereof, gearing mounted eccentrically to and connected with the shaft, means for adjusting the gearing orbitally with relation to the shaft, an arm mounted at one end on and movable with the gearing and extending transversely of the vehicle toward the other side thereof, a rotary excavating device mounted on the arm at the end remote from the first-named end, a drive chain extending from the gearing to the rotary excavating device for driving the latter and provided with excavating blades, a support for the end of the arm carrying the rotary excavating device and through which the arm is movable lengthwise of said arm, and means under the control of an operator for raising and lowering the support to correspondingly raise and lower the arm without interference with lengthwise movements of the arm due to the orbital movement of the gearing carrying the first-named end of the arm.

In testimony, that I claim the foregoing as my own, I have hereto affixed my signature in the presence of two witnesses.

VIRGIL T. GRABS.

Witnesses:
 Coy D. Slate,
 O. L. Rains.

Copies of this patent may be obtained for five cents each, by addressing the "Commissioner of Patents, Washington, D. C."